United States Patent [19]
Bailey

[11] Patent Number: 5,635,403
[45] Date of Patent: Jun. 3, 1997

[54] SAMPLE CONTAINMENT CARD FOR AIR OR STATION CONTAMINATION MONITORING SYSTEM AND PROCESS

[75] Inventor: William H. Bailey, Johnson City, Tenn.

[73] Assignee: Nuclear Fuel Services, Inc., Erwin, Tenn.

[21] Appl. No.: 338,954

[22] Filed: Nov. 14, 1994

Related U.S. Application Data

[63] Continuation-in-part of Ser. No. 807,110, Dec. 13, 1991, Pat. No. 5,468,968.

[51] Int. Cl.$^6$ .................................................. G01N 33/72
[52] U.S. Cl. .................. 436/66; 436/5; 436/177; 436/178; 436/181; 422/55; 422/56; 422/57; 422/58; 422/61; 422/71; 422/86; 422/87; 422/88; 422/101; 422/102
[58] Field of Search ................ 422/56, 58, 86, 422/87, 88, 101, 71, 55, 61, 102, 57; 436/5, 177, 178, 181, 66, 56

[56] References Cited

U.S. PATENT DOCUMENTS

| | | | |
|---|---|---|---|
| 3,348,044 | 10/1967 | Sanders | 250/83 |
| 3,990,850 | 11/1976 | Friedman et al. | 422/55 |
| 3,996,006 | 12/1976 | Pagano | 23/253 |
| 4,092,120 | 5/1978 | Suoveniemi et al. | 422/58 |
| 4,225,557 | 9/1980 | Hartl | 422/56 |
| 4,259,964 | 4/1981 | Levine | 128/638 |
| 4,336,532 | 6/1982 | Biehl et al. | 340/600 |
| 4,367,750 | 1/1983 | Levine | 422/61 |
| 4,486,536 | 12/1984 | Baker et al. | 436/66 |
| 4,645,743 | 2/1987 | Baker et al. | 436/66 |
| 4,700,067 | 10/1987 | Carossi et al. | 250/380 |
| 4,742,002 | 5/1988 | Guedagno | 436/66 |
| 4,789,629 | 12/1988 | Baker et al. | 436/66 |
| 4,820,925 | 4/1989 | Balmer et al. | 250/379 |
| 4,962,043 | 10/1990 | Negase et al. | 436/165 |
| 4,988,876 | 1/1991 | Doughty | 250/336.1 |
| 5,100,619 | 3/1992 | Baker | 422/58 |
| 5,179,281 | 1/1993 | Tawil et al. | 250/337 |
| 5,182,191 | 1/1993 | Fan et al. | 436/66 |
| 5,203,327 | 4/1993 | Schoendorfer | 128/632 |
| 5,238,847 | 8/1993 | Steinbiss et al. | 436/66 |
| 5,468,968 | 11/1995 | Bailey et al. | 250/435 |

*Primary Examiner*—Jill Warden
*Assistant Examiner*—Sharidan Carrillo

[57] ABSTRACT

A tracking and identification card for an air filter specimen, the card having a sheet-like base with a substantially flat support surface for supporting the specimen, the base having a substantially uniform thickness of from about 3 to about 20 mil, and having a focus axis oriented substantially normal to the support surface, a locator area on the support surface and provided with contact adhesive for adhesively holding the specimen in a particular position on the support surface upon contact of the specimen with the adhesive, a sheet-like cover in contact with and substantially overlying the adhesive, the cover being readily removable for exposing the adhesive and allowing the specimen to be placed in contact therewith, and indicia markings on the base for interfacing with an indicia reader for tracking the location and identity of the card within an air monitoring system.

9 Claims, 5 Drawing Sheets

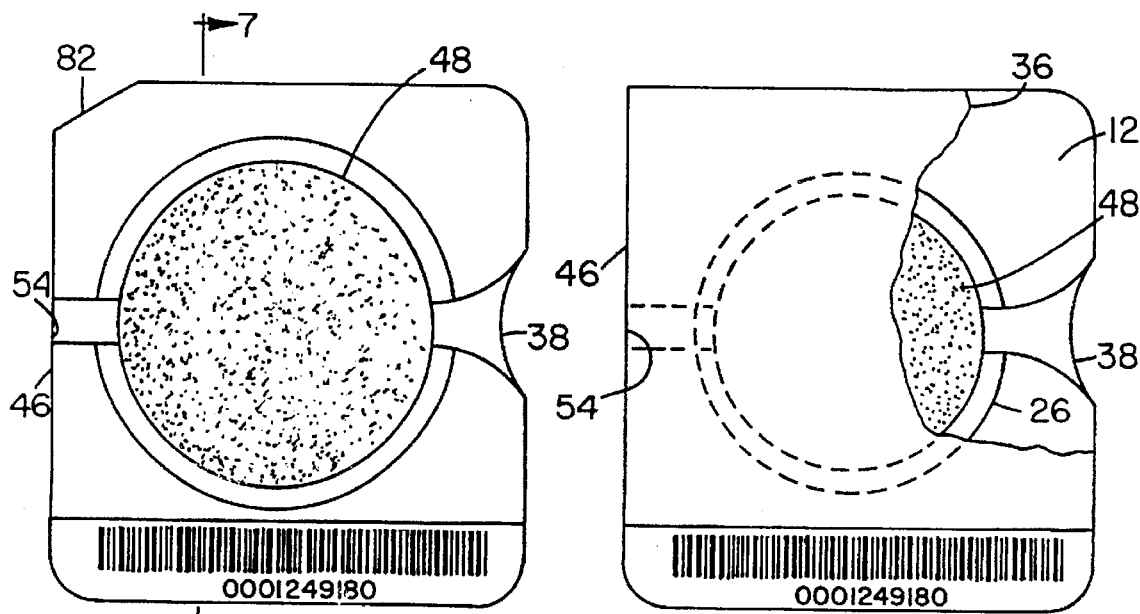
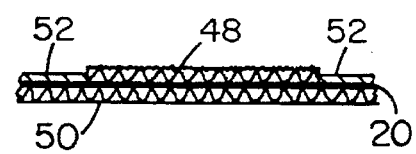
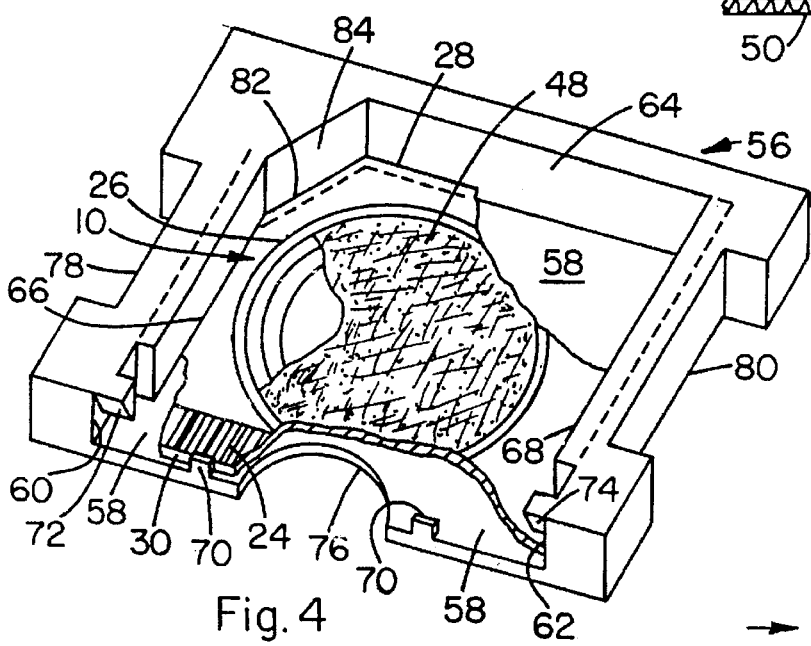
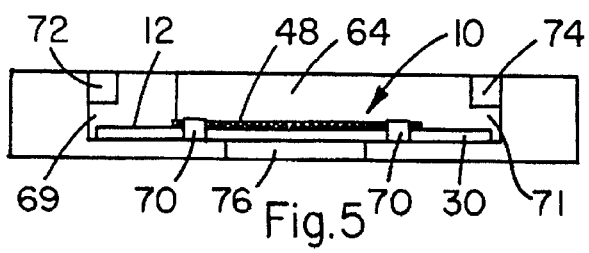
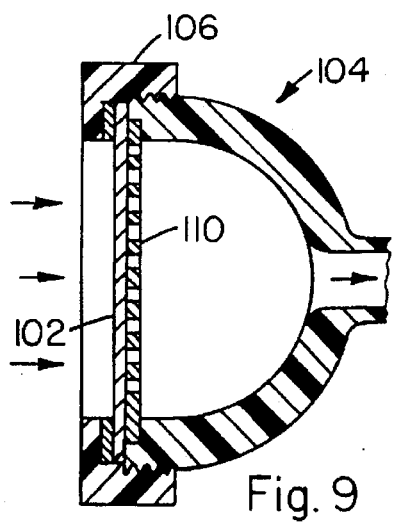

SAMPLE CONTAINMENT CARD FOR AIR OR STATION CONTAMINATION MONITORING SYSTEM AND PROCESS

This application is a continuation-in-part of applicant's Ser. No. 07/807,110 filed Dec. 13, 1991, now U.S. Pat. No. 5,468,968 and the invention concerns an improved containment means, i.e., a readily handleable tracking and identification card, for holding and carrying such contamination sampling means as airborne particle filters or contact sampling items such as dabs, evaporation dishes, or the like, for use in systems which monitor air quality or equipment contamination, e.g., by biological, chemical or radioactive materials, particularly in the workplace, whether the workplace consists of one or more rooms or buildings with exposed equipment, furniture, and the like, or even one or more plant sites, via the collection and use of data such contaminating materials, particularly radioactive particulate materials such as dust or combustion emitted particles, typically referred to as aerosols, the system providing one or more facets of enhanced data accuracy, security, retrievability, and accountability of operating personnel through recorded chain of custody, or the like.

In industry, in particular, a great deal of effort is presently being directed to providing a working environment which is medically safe for employees. This effort is not limited to work areas subject to ambient (airborne) radioactivity, but encompasses ambient biological and chemical contamination as well, including vaporous, gaseous and colloidal or other particulate chemical contaminants.

Especially troublesome to the monitoring of such contamination are the mechanics of sampling, sample analysis and analytical processes applied to the samplings. For example, where the monitoring system which is designed to provide reliable workplace data on individual employees in a readily available and prompt manner, involves 200 employees, 150 workplaces and three shifts per day, the ambient monitoring over a 24 hour period easily involves 12,000–20,000 or more workplace air sampling initiations and terminations. The occurrences therefore, of inadvertent sample mix-ups alone, not to mention intentional but misguided sample taking or handlings, or other error possibly introduced by the detection and counting equipment itself, is quite high.

DISCUSSION OF PRIOR ART

Heretofore, many air sampling devices for airborne materials, particularly for radioactive particulates, have been described, including those shown int he following U.S. patents, the disclosures of which for structure and utility are incorporated herein by reference: U.S. Pat. Nos. 4,988,876; 4,820,925; 4,092,539; 4,700,067; 4,415,237; 4,489,315; 4,480,311; 4,342,913; 4,336,532; 4,320,393; 4,301,367; 4,286,155; 3,878,496; and 3,614,442. The efficacy of such devices for their particular intended use is not questioned here, however, insofar as meeting the requirements of an overall monitoring system involving vast numbers of samples is concerned, the prior devices, at best, represent only a potential component of the overall system.

Principal objects therefore, of the present invention are:

to provide an improved overall sampling system for generating contamination information regarding airborne or settled, e.g., furniture contamination, such as by radioactivity within the workplace, e.g., via rate of deposition of radioactive particulates, and their emission levels, on filters or other sampling items to insure worker safety, health, and compliance with NRS, EPA, OSHA or the like regulations, DOE orders, court-dictated safety requirements and the like;

to improve personal history accuracy in regard to the contamination exposure i.e., air sampling representative of exactly what the worker actually breathed in or is actually breathing in;

to determine the long rage accuracy of stationary, workplace samplers with respect to abnormal occurrences of radiation emission;

to obtain airborne radiation data for subsequent total exposure (external and internal) determination;

to minimize errors in data collection and facilitate the prevention of deviation by workers from regular procedures for data collection and subsequent data processing;

to improve software and computer security by preventing unauthorized access to data, and honest error while also providing an audit or tracking trail of data handling and filter collection and analysis, e.g., accountability of personnel involved;

to enhance the capacity of the system for handling large numbers of samples which allows an almost infinitely detailed and continuous monitoring program;

to shorten the period between sampling and analysis reporting such that corrective measures can be taken promptly where necessary;

to improve the capacity of the monitoring system to utilize any of a variety of characterization analyzers such as radiation counters;

to provide the above system in a form which is operative also for monitoring various airborne or settled chemicals, e.g., ketones, aldehydes, sulfides and the like and also biological depositions;

to provide such a system which can interface readily with remote data reception sites, e.g., for archiving, further analysis, generation of Government required reports, and the like;

to provide such a system with a uniquely constructed tracking and identification card for carrying a filter or other sampling item and which is bar coded and readable in-situ in magazines of automatic radiation detection and counting or the like analytical apparatus;

to provide such a system with a uniquely constructed holder for said card which functions well with a variety of stationary and portable particle collection means of high volume, low volume, grab sampling, lapel sampling, continuous air monitoring, or the like capacities; and to provide such a system adaptable to monitoring locations which are either inaccessible or impractical to the use of continuous type monitoring systems.

BRIEF SUMMARY OF THE INVENTION

These and other objects hereinafter becoming apparent have been attained in accordance with the present invention which, in the broad aspects of its structural embodiment is generally defined as a tracking and identification card for a contamination sample specimen comprising a sheet-like base means having a substantially flat support surface for supporting said specimen, said base means having a substantially uniform thickness, preferably of from about 3 to about 20 mil, and having a focus axis oriented substantially normal to said surface, locator means on said surface being provided with contact adhesive means for adhesively holding said specimen in a particular position on said surface upon contact of said specimen with said adhesive means, sheet-like cover means in contact with and substantially overlying said adhesive means, said cover means being readily removable for exposing said adhesive means and allowing said specimen to be placed in contact therewith, and bar code indicia means on said base means for interfacing with bar code reader means for tracking the location and identity of said card within a contamination monitoring system.

In certain preferred embodiments:

(a) said locator means comprises at least one locator marking thereon for positioning a filter specimen on said support surface in a desired position with respect to said axis;

(b) said card wherein protective leaf means is hingedly connected to said base means for folding over onto a sampled filter specimen adhesively secured to said support surface for protecting the same during handling within said monitoring system, said leaf means being so dimensioned and said indicia means being so located on said base means as to expose said indicia means to view when said leaf means if folded over onto said specimen;

(c) said card wherein said base means is substantially rectangular and formed with a top, bottom and opposite side edges, said leaf means is hingedly connected to said base means along one side edge thereof, said base means is provided with a cut-out in the other side edge %hereof opposite said one edge, said cover means is elongated and formed with an inner end and an outer end and extends from said one side edge to said other side edge with said outer end lying across said cut-out, said cover means being secured to said base means from end to end by pealable adhesive means whereby said cover means can readily be removed by gripping the section thereof overlying said cut-out and pulling upwardly away from said support surface;

(d) said cover means is attached at its inner end to said leaf means whereby said cover means is readily replaced in position over a specimen which has been stuck onto said adhesive means for further maintaining the integrity thereof;

(e) said card wherein said leaf means is hingedly connected to said base means by perforated tear line means whereby said leaf means can be detached readily from said base means for allowing a filter specimen which is adhesively secured to said base means to be scanned by radiation analyzer means; and (f) said leaf means is provided with attachment means, and an unexposed contact sampling specimen is detachably mounted on said leaf means by said attachment means, whereby said specimen is made available from said card for immediate use, such as by wiping across a contaminated surface, and then for immediate placement on said adhesive means on said card for safe transport, storage or analysis.

In the broad aspects of the method embodiment of the invention which concerns preparing a contamination sampling specimen for introduction into an analyzer means for characterizing contaminant material collected by said specimen, said method comprises providing a tracking and identification card for said specimen wherein said card comprises a sheet-like base means having a substantially flat support surface for supporting said specimen, said base means having a substantially uniform thickness, preferably of from about 3 to about 20 mil, and having a focus axis oriented substantially normal to said surface, locator means on said surface being provided with locator markings and contact adhesive means for adhesively holding said specimen in a particular position on said surface upon contact of said specimen with said adhesive means, sheet-like cover means in contact with and substantially overlying said adhesive means, said cover means being readily removable from said adhesive means for exposing said adhesive means and allowing said specimen to be placed in contact therewith, and bar code indicia means on said base means and spaced from said support surface for interfacing with bar code reader means for tracking the location and identity of said card within a contamination monitoring system, removing said cover means from said adhesive means, placing said specimen in contact with said adhesive means in a position corresponding to said markings to secure said specimen to said surface whereby said specimen is oriented relative to said focus axis to ensure accurate characterization of said containment material by said analyzer means.

In certain preferred aspects of the above method:

(a) said cover means is layed back over the specimen after it is adherd to said adhesive means; or (b) a protective leaf is provided on said base means and is foldable over said specimen or over the cover means layed over said specimen after said specimen has been adhered to said adhesive means for maintaining the integrity thereof prior to placing said card in an analyzing device.

BRIEF DESCRIPTION OF THE DRAWINGS

The invention will be further understood from the drawings wherein:

FIG. 3 is a top view of as in FIG. 2 with the cover means and protective leaf means completely removed by tearing off along tear line 46, and a filter disc, i.e., sampled specimen, supported in place on the adhesive means and on the surrounding portions of the support surface;

FIG. 4 is a perspective view of a unique holder for the card with a portion of the card and filter shown;

FIG. 5 is a front edge on view of the holder with the card and filter shown in place therein;

FIG. 6 is a top view of the card with a pregnant specimen thereon and the protective leaf means in operative position;

FIG. 7 is a cross-sectional taken along line 7—7 of FIG. 3 in the direction of the arrows, with the thickness of the card, adhesive and filter enlarged for clarity;

FIG. 9 is an enlarged cross-sectional view of a typical filter head useful in the present invention;

Figure 1:
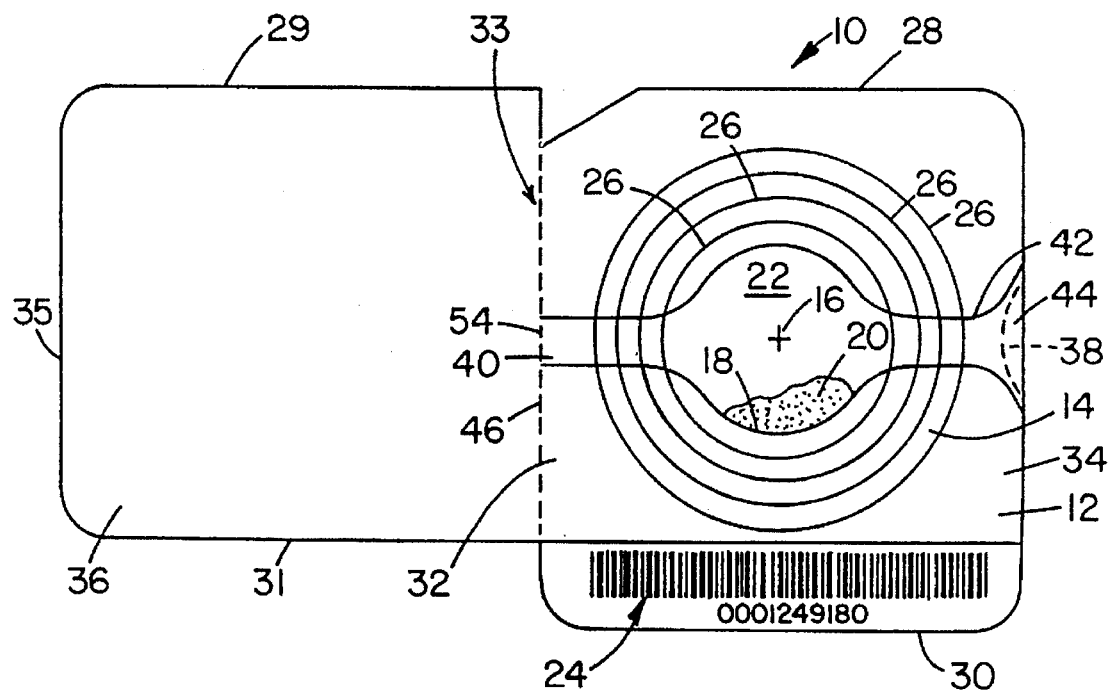
FIG. 1 is a top view of the present card with the protective leaf means opened to expose the filter support surface and the cover means, with a portion of said cover means broken away to expose a segment of the contact adhesive means.
Figure 2:
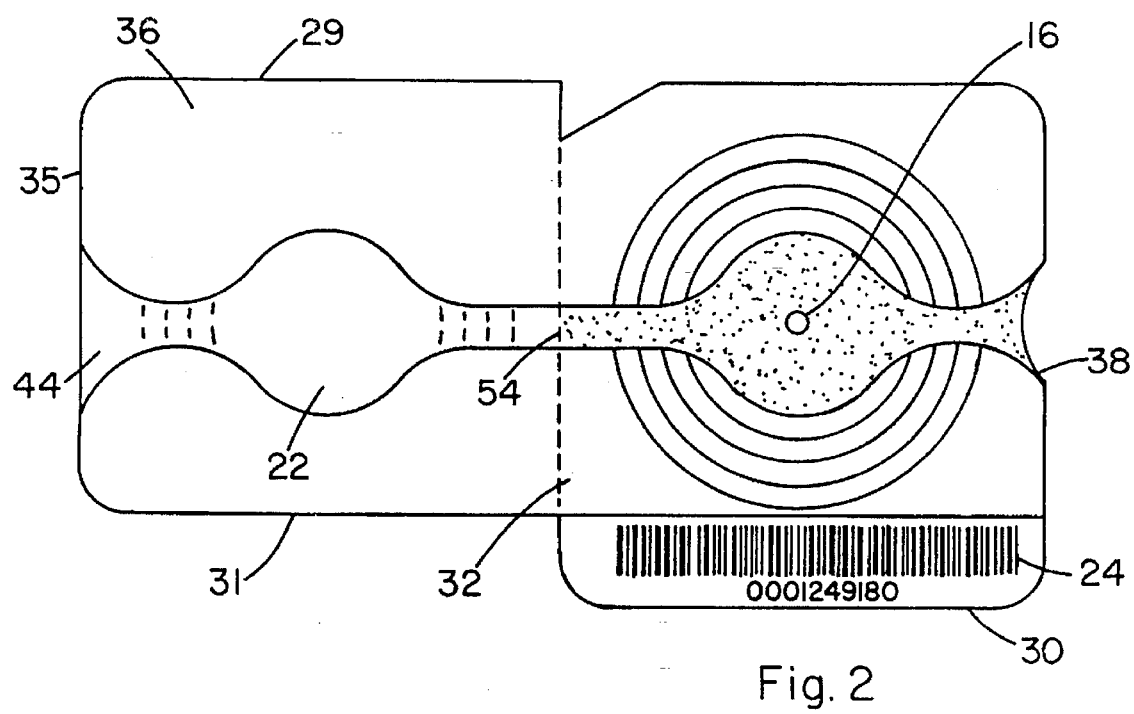
FIG. 2 is a top view as in FIG. 1 with the cover means pealed back away from the support surface to expose the contact adhesive means.

Referring to the drawings and with particular reference to the claims hereof, the present tracking and identification card generally designated 10 comprises a sheet-like base means 12 having a substantially flat support surface 14 for supporting said specimen, said base means having a substantially uniform thickness, preferably of from about 3 to about 20 mil, and having a focus axis 16 oriented substantially normal to said surface, locator means 18 on said surface being provided with contact adhesive means 20 for adhesively holding said specimen in a particular position on said surface upon contact of said specimen with said adhesive means, sheet-like cover means 22 in contact with and substantially overlying said adhesive means, said cover means being readily removable for exposing said adhesive means and allowing said specimen to be placed in contact therewith, and bar code indicia means 24 on said base means for interfacing with bar code reader means for tracking the location and identity of said card within an air monitoring system.

The base means 12 is preferably of high quality paper, pasteboard, paperboard or the like, but may be formed from other material such as plastic sheet. The card may be of any configuration, however the rectangular shape as shown in the drawings is preferred for ease of handling, storage, and proper orientation for placing in the holder of an analyzer. The base means is formed with a top 28, bottom 30 and opposite side edges 32, 34. The leaf means 36 having a top edge 29, a first side edge 35, a bottom edge 31 and an apposite side edge 33, is hingedly connected to the base means along one side edge 32 thereof, and the base means is provided with a cut-out 38 in the other side edge 34 thereof. The cover means is preferably elongated and formed with an inner end 40 and an outer end 42 and extends from said one side edge 32 to said other side edge 34 with said outer end terminating in a section 44 lying across said cut-out. The cover means is secured to the base means from end to end by the pealable adhesive means 20 whereby the cover means can readily be removed by gripping the section 44 thereof overlying the cut-out and pulling upwardly away from the support surface. The adhesive means 20 is conventional contact adhesive which can bond to the sampled filter specimen strongly enough to prevent its inadvertent disengagement from the support surface, but which allows the cover means 22 to be easily pealed off of said surface. For this purpose the cover means is preferably made of a waxy or high sheen type paper which bonds only moderately to the adhesive. In this regard, in the preparation of the card, the lower layer 50 of both base means 12 and leaf means 36 is first stamped as a unit from the paperboard, and then coated with the sticky or contact adhesive 20. The top layer 52 on which the locator markings are printed, preferably covers the entire lower layer and the adhesive thereon. The bar code indicia is printed on the base means before or after the top layer is applied. The cover means is knife-cut or press-cut through the top layer before it is applied to the adhesive and is retained as part of the top layer by the short perforated segment 54 at its inner end 40 until the card (adhesive) is ready to receive a sampled specimen 48.

The protective leaf means is hingedly connected to the base means along the perforated tear line 46 for folding over onto the sampled filter specimen adhesively secured to said support surface for protecting the same during handling within said monitoring system. The leaf means is dimensioned and the indicia means is located on the base means at a location to expose the indicia means 24 to view when the leaf means if folded over onto the specimen as shown in FIG. 6.

The focus axis 16 is preferably located in the center of the locator markings or concentric rings 26, any number, configuration and diameter of which may be marked on the support surface 14 such that different sizes or shapes of filter discs or elements may be employed. The locator markings are important to ensure that the reading or viewing axis of the analyzer or other characterization reader is directed along the focus axis of the specimen such that the most accurate reading, e.g., radiation type and count, by the analyzer can be attained.

A preferred holder for the present card is shown in FIGS. 3–5 and comprises a body 56, preferably of plastic such as rigid butyrate, polyolefin or polyamide having a floor 58, inner side walls 60, 62 and inner back wall 64. The inner side walls are provided at their upper portions with overhanging sections 66, 68 which provide side slots 69, 71 into which the card with the sampled specimen affixed thereto can be inserted. The card and holder are dimensioned such that when the top edge 28 of the card abuts wall 64, the bottom edge 30 of the card will fall in behind retainer nibs 70 projecting upwardly from floor 58 and be retained thereby on the holder.

Beveled edges 72, 74 on the entry ends of sections 66, 68 respectively assist in sliding the card into said side slots. A cut-out 76 in floor 58 provides for easy gripping of the card for entry into or removal from the holder. Registry indents 78, 80 are provided in the sides of the holder for fitting the loading magazine of an analyzer such as a Tennelec radiation counter A beveled corner 82 of the card and a mating beveled wall portion 84 of the holder ensures the proper orientation of the card and sample specimen within the holder and thus within the analyzer.

Figure 10:
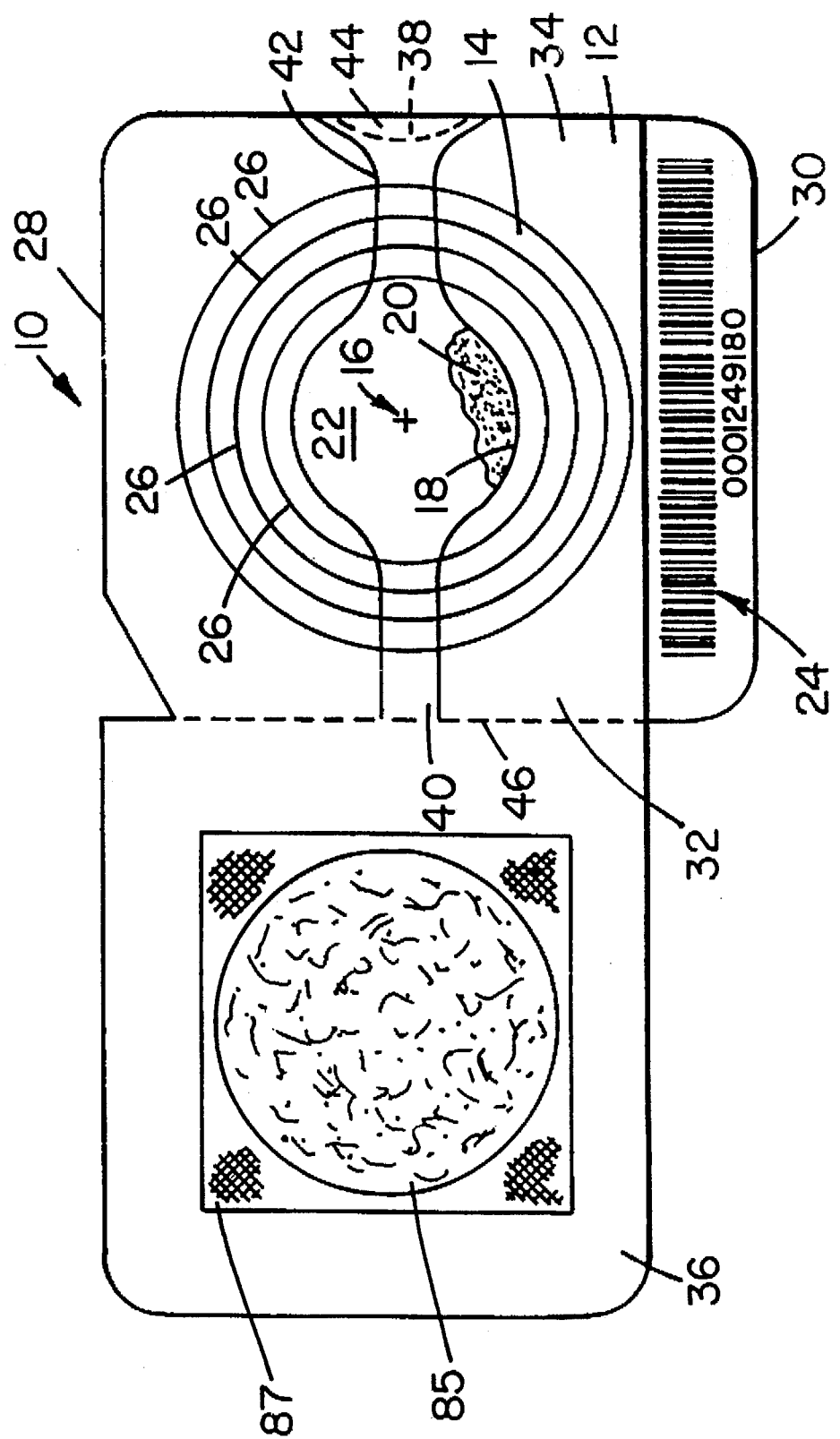
FIG. 10 is a view as in FIG. 1 with an unexposed contact sampling specimen, i.e., dabber means attached to the leaf means.
Figure 11:
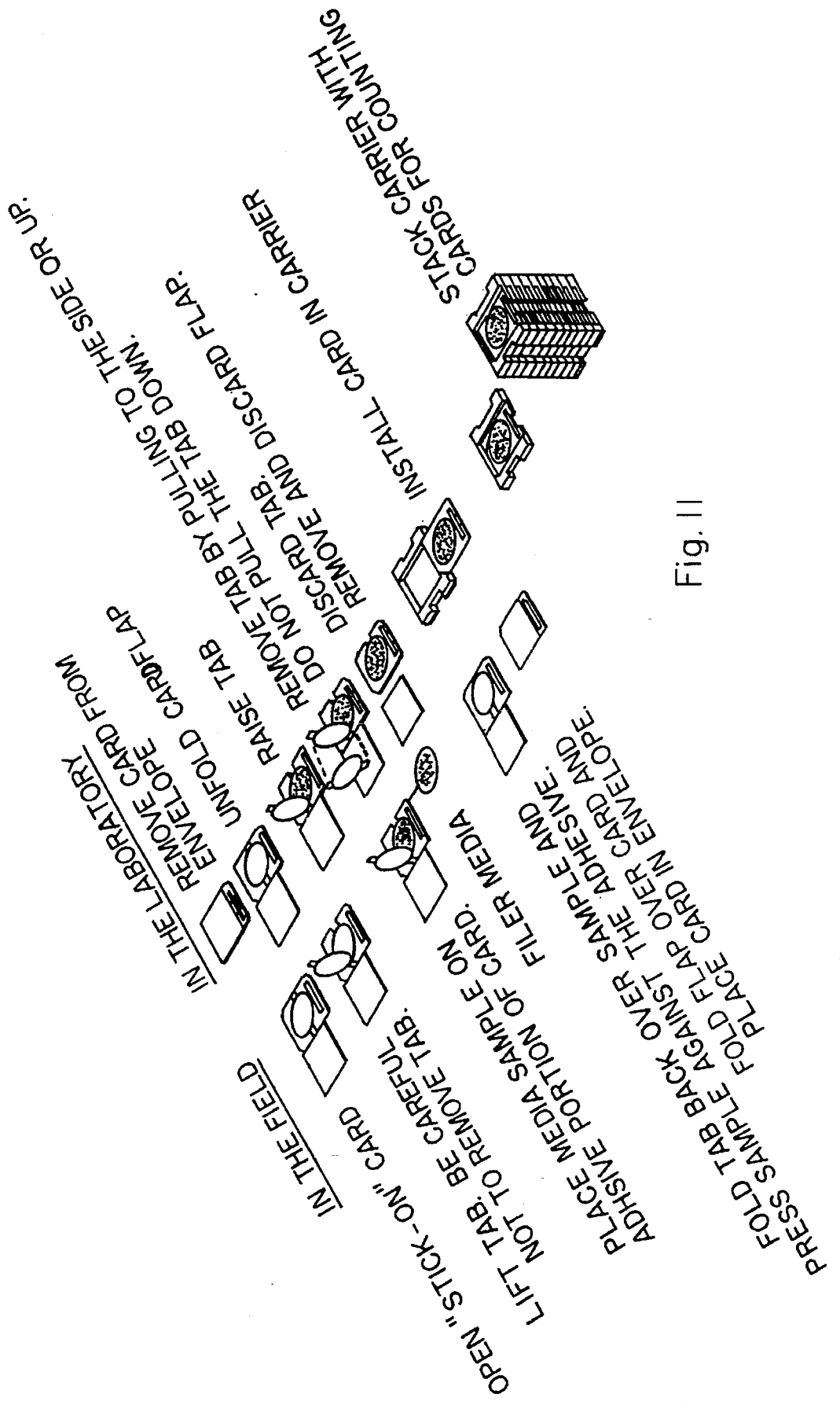
FIG. 11 is a schematic of the steps which are employed in using the present card in a preferred embodiment of the present method.

Referring to FIG. 10, a preferred form of card and associated method of use employs a specimen of fibrous or other material in the form of a dabber means, e.g., cotton, wool, synthetic, etc., wiping pad or cloth piece 85 of reasonably thin dimensions, e.g., preferably less than about ⅛ inch. This dabber means is preferably covered by and held onto the leaf means 36 by a piece of protective clear plastic film 87 which is lightly adhesively affixed on said leaf means, until said dabber means is ready for use. At that time, the film 87 is pealed from said leaf means and the dabber means is ready for contact with any surface of furniture, equipment, building or other structure on which contaminating material, e.g., radioactive particulate dust or the like has settled. The dabber is then placed and stuck onto the adhesive means 20 and the cover means 22 and leaf means 36 are then folded back over the now sampled or exposed specimen 85. It is noted that the dabber means may contain chemically reactants which can react with contaminating material and become chemically and/or physically altered such as to be able to give a color, density or other property signal to the analyzing device for characterizing the type and/or level of sampled contaminant.

It is further noted that use of the present card is not limited to specimens which are designed for exposure to contamination carried by particulate, gaseous or solid carriers, but also finds utility for liquid carriers such as organic or aqueous plant site waste which has been exposed to radioactive, biological or chemical contaminants. For such specimens, the contaminated liquid may be sampled by, e.g., a dabber, or it may be placed in a shallow dish or other such receptacle and either substantially dried or admixed with neutral filter material such as clay or cellulose fiber or the like such that the specimen takes on a moist, semi-solid consistency for allowing attachment of the receptacle to the card and subsequent analysis without loss of the liquid.

Figure 8:
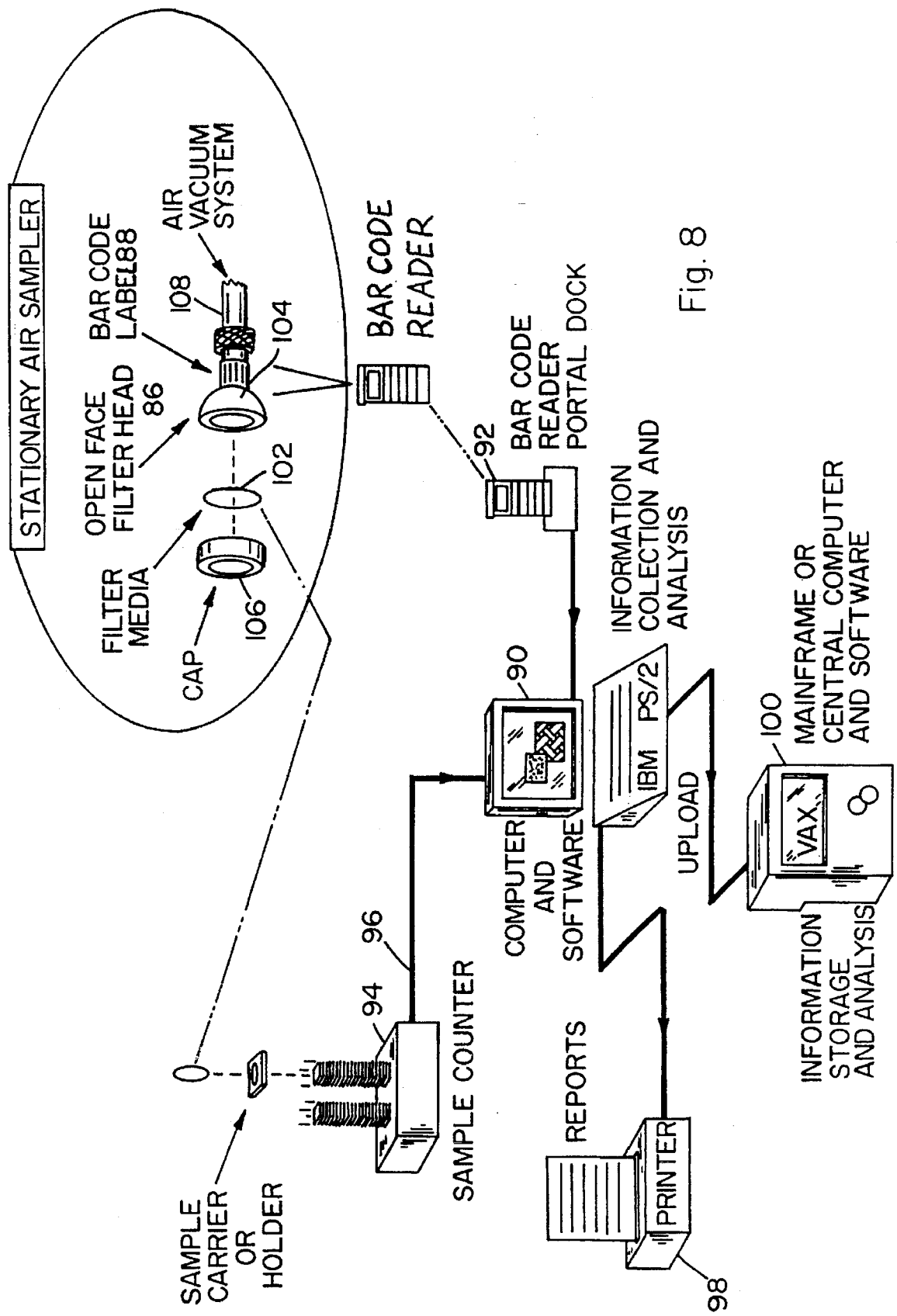
FIG. 8 is a schematic of a computerized air monitoring system for radiation exposure, in which the present card has exceptional utility.

A preferred type of apparatus and process or system in which the present card and holder is to be used is shown in FIG. 8. The system is used for the collection and use of data on airborne materials to generate a radiation exposure profile for each of a number of workers and provides one or more facets of enhanced data accuracy, security, retrievability, and accountability of personnel, chain of custody, or the like, for achieving worker radiation exposure-ALARA (as low as reasonably achievable), and with reference to FIG. 8 comprises the following components:

(a) airborne material collection or sampling means (86) which may be provided with sampling means identification and location indicia means (88) such as a bar code;

(b) computer means (90) for storing and/or processing data, hereinafter referred to, but not limited to personal computers—PC;

(c) retrieval means (92) for interfacing with said indicia means and said computer means for accessing and storing record data in accordance with said indicia means, said retrieval means also being adapted for transporting said record data to said computer means;

(d) analysis means (94) for providing property data on materials deposited on said sampling means;

(e) linkage means (96) for transporting said property data to said computer means; and (f) said computer means (90) being adapted for correlating said record data and said property data and calculating alpha/beta ($\alpha,\beta$) radiation exposure and reporting, e.g., by printer (98), and/or forwarding on to data storage or further processing facilities (100) a radiation exposure profile for each particular worker.

It is noted that the radiation designation "$\beta$" actually includes gamma, since the overlapping energy levels of each type of radiation can influence the detector.

The method for employing the above components and the present card concerns obtaining reliable and accurate radiation exposure data for a worker who typically enters and exits at least one workplace one or more times during his workshift, said method comprising the steps of:

(1) taking at least one airborne particulate sample within each workplace with air pressure differential operated sampling means, and incident thereto, computer recording the following record data;
  (a) sample identity,
  (b) worker identity,
  (c) time of each entry and exit of the worker at each workplace;
  (d) time of each sampling initiation and termination; and
  (e) air flow rate through each sampling means;

(2) placing each sample in radiation analyzer means which records the sample identity as record data;

(3) operating said analyzer means to generate $\alpha$ and $\beta$, radiation property data for each sample;

(4) transporting the data from (2) and (3) to said computer means; and (5) correlating all of the above data within said computer means and providing a radiation exposure profile for the worker.

With further reference to FIGS. 8 and 9, the collection means generally designated 86 comprises a filter media, e.g., a filter paper disc 102, an open face filter head 104, a screw on cap 106, and an air vacuum line 108. A multi-perforated metal or plastic backing plate or screen 110 may be used to help support the filter disc. The system is primarily designed to monitor the radiation ($\alpha,\beta$) emitted by airborne particles in the workplace, and for this use a Whatman, Gelman, or equivalent brand filter is preferred. The filter should be of adequate size to give a fair sampling and a preferred actual dimension therefor is shown in FIG. 3. The filter should be constructed to allow an air flow of from about 0.5 to about 5.0 ft.$^3$/min. at a suction differential pressure of from about 640 mmHg., for a filter surface area of from about 20 mm$^2$ to about 200 mm$^2$. The two types of preferable filters are Whatman 41 ashless, 47 mm., and Gelman type A/E glass fiber filter, 47 mm. The means for supporting the sampling filter disc can be greatly varied as shown in the prior art and includes any of a variety of available open face filter heads such as, e.g., the assemblable type holder shown in FIG. 8, marketed as a Gelman Science, Inc. Model 1220 open face filter head.

As alternative useful indicia means there may be mentioned attachable microchip data storage devices, holograms, chemical signatures, "invisible" bar codes, electronic transmission (radiowaves, microwaves), automatic sensors, chemical heat signatures, sonic signatures, raised characters in the manner of braille, fiber pattern recognition, magnetic strip signature, light emitting diode technology and punched hole recognition or the like. The methods for using such indicia means are well known to the art.

The present system may be also be used for monitoring airborne chemicals, particulate materials, vapors or the like, employing known deposition or contact substrates therefor. In this regard, chemical analysis devices which detect qualitatively and quantitatively and report results electronically are available for a wide variety of inorganic and organic particulates and vapors or gases and can be used in place of the radiation counter shown in the drawings. Likewise, for such vapors or gases, collection chamber devices or chemically reactive substrates can be employed in known manner in place of the radioactive particulates filter for generating the necessary chemical property data.

In the present embodiment of the above apparatus and method, the record data is obtained by bar code reader means from bar code label means associated with each sample, and the record and property data are transported by the reader means to computer means having the capacity for calculating from the property data, sampling period, and air flow rate, and $\alpha$, $\beta$ radiation exposure profile for the worker.

The computer means useful in accordance with the present invention for storing and/or processing data is exemplified by the IBM PS/2 indicated in the drawings. This computer is preferably adapted to employ a custom based software program for an IBM-compatible personal computer which will perform the following functions: interface with the bar code readers; interface with the Tennelec LB5100 alpha/beta counter; maintain air sample station data to link sampler identification with location; merge bar code reader data with Tennelec data; process merged data and produce initial and decay concentration reports; and export air sample data to the site's centralized database if desired. An exemplary such computer is the 386, 25 Mhz IBM compatible PC with 4 MB RAM, 2 serial and 1 parallel port, VGA card, VGA color monitor, and an 80 MB hard drive computer.

The CPU of the computer can be configured with an Intel 32 bit microprocessor, model 80286, 80386, 80486, or the like operating on a 16 bit internal bus. 640,000 Bytes of core Random Access Memory (RAM) is preferred, operating at a read/write cycle time of at least about 120 nanoseconds. A peripheral on-line radom access storage unit is desirable which consists of a high-speed 20 megabyte disc drive with fast access time of, e.g., 160 milliseconds maximum total and 85 milliseconds average. This peripheral will provide on-line storage for the operating system and all software programs needed for operation and testing. A 1.2 or 1.44 megabyte diskette drive is preferred for transferring operating system and application programs to the on-line random access storage unit.

A video graphics array (VGA) color or monochrome analog monitor is desirable for operation. The monitor is attached to the CPU bus via a 16-bit VGA adapter card. An RS-232 standard serial communication adapter attached to The CPU bus is preferred for communicating with bar code reader means. A Centronics parallel communication adapter attached to the CPU bus is used to communicate with the printer.

The exact programs to implement the invention, where one or more programmable computers are used, varies with the computers, data base organization, programming language and like factors chosen for the implementation. Programs which implement the above airQUALITY data flow and logic are preferred. Any such computer having equivalent command and memory capacity and program versatility may be employed however.

Useful data retrieval means such as bar code or other indicia readers, scanners or the like having transmission facility for data important to The computer means include the INTERMEC models, particularly the 9440, these devices being shown and described in the INTERMEC sales Catalog (55 pages), dated Dec. 5 1990, of INTERMEC, 178 Northwestern Ave., Oak Ridge, Tenn. 37830. Further details of such useful bar code devices and technology is found in U.S. Pat. Nos. 4,794,239 and 4,432,830, the disclosure of which are incorporated herein by reference. Also, other devices such as and the Symbol Technologies, Inc. 116 Wilbur Place, Bohemia, N.Y. 11716, entitled "LDT 3805 Laser Data Terminal" may be employed. The term "record data" as used herein and for which the above retrieval means is employed includes, for example, in addition to currently obtained data, background information on the employee who is wearing the air sampler to be processed or who is working at the particular workstation where the stationary air sampler to be processed is positioned. This background information can include a complete work history of the worker in regard to his previous work assignments and workplaces, duration in each workplace, radiation exposure in each workplace, any of his special medical or other circumstances which might bear on his ability or need to function in such a workplace, or the like which would be useful in monitoring his radiation exposure status.

The analysis means for providing property data on airborne materials collected on the filter means can be done by any suitable $\alpha$, $\beta$ detector and counting device, but preferably by the TENNELEC system which utilizes an automatic sampler changer that allows the user to load samples in carriers for automatic positioning therein for analysis. The instrument will automatically transfer the sample to the counting chamber for analysis and count the samples radiation output for a period of time which is determined by the user. A variety of such devices are available, their selection depending upon the type of analysis required.

The preferred counting system employs the present software which particularly enhances the Tennelec LB5100 alpha/beta counting equipment. Therefore, a Model LB5100 Tennelec alpha-beta counter with 3.05 firmware, 1.66 or greater operating software, and a floppy disk drive is most desirable. Additional hardware including the above identified PC allows the present software program to integrate with the Tennelec LB5100. This hardware preferably comprises the following: Intermec 9440 Bar Code Reader with 128K RAM, case, and battery; Intermec wand scanner (1 for backup); Intermec docking module; Intermec power supply; Intermec PC interconnecting cable; Intermec battery charger/discharger; Intermec backup battery pack for Intermec 9440 bar code reader; and Hewlett Packard LaserJet IIIP printer with cable.

Further details of the construction and operation of the Tennelec counter are given in the sales brochure (15 pages) entitled "LB5100 Series III, LB5100 Series III-PC" of the TENNELEC company of 601 Oak Ridge Turnpike, Oak Ridge, Tenn., and in the sales brochure (4 pages) entitled "TENNELEC APC Series II Automatic Planchet Counting System"- APC SERIES II 5.OK 290-TENNELEC/ NUCLEUS, Inc., of the same address.

The count data may be stored on a diskette or the like for transfer to another system, or may be directly transferred to the computer via a communication port. This raw data may be used in conjunction with a software package to produce a variety of analytical reports. The TENNELEC system communication interface methods allow the connection of the Tennelec system to a personal computer (PC) using industry standard techniques. Interface protocols supported by the Tennelec system include RS-232, IEEE 488, and direct diskette file access.

The present AIR QUALITY system employs state-of-the-art bar coding techniques for data collection, and utilizes preferably Intermec 9440 bar code readers. The present software simplifies the air sample collection process by enabling the operator to use the bar code reader as a guide for data entry. The software utilizes on-line, menu drive screens which prompt the user to key in important information concerning the various transactions. This data is immediately stored on systems files for instant data retrieval by the user. The software produces a file which is periodically transferred to the mainframe computer system. Using the Export Decay Concentration Data transaction, the User is prompted to download valuable decay analysis data to floppy disk in "Drive A". The data is then uploaded to mainframe files using existing programs. This program further integrates with and is one of the core modules of a "TOTAL EXPOSURE" program which is a comprehensive system for tracking and reporting personnel exposure, both internal and external. It tracks personnel movement throughout a site, correlating existing environmental conditions, and also collects personnel exposure records, including dosimetry and bioassay information, in order to provide a complete and total exposure record for an individual. Exposure reports are generated automatically by the system to help support regulatory reporting requirements.

The invention has been described in detail with particular reference to preferred embodiments thereof, but it will be understood that variations and modifications will be effected with The spirit and scope of the invention.

I claim:

1. A tracking and identification card for receiving and retaining a separate sheet-like sampled filter specimen having a geometric perimeter, said card comprising a sheet-like base means of substantially uniform thickness and having a substantially flat support surface with a focus axis oriented substantially normal to said surface, contact adhesive means on portions of said surface and including said axis, a plurality of specimen locator markings on said surface arranged substantially concentrically to each other about said axis, said markings lying predominantly radially outwardly from said adhesive means, said base means having an edge segment lying outside of said markings, said adhesive means for adhesively holding said specimen in a focused position on said surface with respect to said axis upon transport of said specimen to said card and placement of said adhesive thereon into contact with said adhesive means with the specimen's geometric perimeter substantially concentrically positioned with respect to said locator markings, an elongated sheet-like protective cover means in peelable contact with and substantially overlying said adhesive means, said cover means being readily removable for exposing said adhesive means and allowing said specimen to be placed in sticking contact with said adhesive means, and indicia means on said edge segment of said base means for interfacing with an electronic indicia reader means for tracking the location and identity of said card within an electronic monitoring system.

2. The card of claim 1 provided with a protective leaf means having an edge portion of hingedly connected to an edge portion of said base means, said leaf means folded by way of said edge portion hinge means over said support surface and over a sampled filter specimen adhesively secured to said surface whereby said specimen is protected from physical or chemical disturbance during handling of said card and specimen within said monitoring system, said leaf means being dimensioned such that the area of said support surface which said leaf means overlies when said leaf means is folded over said surface does not include the said edge segment of said base means which contains said indicia means, whereby said indicia means is exposed to view when said leaf means if folded over onto said specimen.

3. The card of claim 2 wherein said base means and said leaf means is each substantially rectangular and formed respectively with a top edge, a bottom edge, and opposite first and second side edges, said second side edge of said leaf means being hingedly connected to said second side edge of said base means to allow said leaf means to be folded over said base means, said base means being provided with a cut-out in its said first side edge, said cover means formed with an inner end and an outer end provided with a gripping section, said cover means extending from said second side edge of said base means to said first side edge of said base means with said gripping section lying across said cut-out, said cover means being secured to said base means substantially from end to end by said adhesive means whereby said cover means can readily be removed by gripping said section thereof overlying said cut-out and peeling said cover means upwardly away from said support surface.

4. The card of claim 1 wherein said locator markings comprise a plurality of concentric rings markings which denote the desired location for proper focusing of filter specimens of substantially circular perimeters of different radial dimensions. dimensions.

5. The card of claim 2 wherein said indicia means is a bar code printed on said edge segment.

6. The card of claim 2 wherein said leaf means is hingedly connected to said base means by perforated tear line means whereby said leaf means is detached readily from said base means for allowing said card and a filter specimen, which is adhesively secured to said base means, to be inserted into a radiation counting device and the specimen scanned by a radiation analyzer means.

7. The card of claim 1 wherein a dabber means is provided on said leaf means and held thereon by an easily removable attachment means, whereby said dabber means is made readily available by detachment from said leaf means for employment in contact sampling.

8. The method for supporting a separate sheet-like sampled filter specimen having a geometric perimeter for introduction into a radiation analyzer means for characterizing contaminant material contained by said specimen comprising:

i) providing a tracking and identification card 10 comprising a sheet-like base means of substantially uniform thickness and having a) a substantially flat support surface with a focus axis oriented substantially normal to said surface, b) contact adhesive means on portions of said surface and including said axis, c) a plurality of specimen locator markings on said surface arranged substantially concentrically to each other about said focus axis, said markings lying predominantly radially outward from said adhesive means, d) an edge segment lying outside of said markings and having indicia means thereon for interfacing with an electronic indicia reader means for tracking the location and identity of said card and specimen within an electronic monitoring system, said adhesive means adhesively holding said specimen in a focused position on said support surface with respect to said axis, e) an elongated sheet-like protective cover means in peelable contact with and substantially overlying said adhesive means, and f) a protective leaf means having an edge portion hingedly connected to an edge portion of said base means;

ii) peeling off said cover means and exposing said adhesive means;

iii) transporting said specimen to said card;

iv) placing said specimen thereon into contact with said adhesive means with said specimen's perimeter substantially concentrically positioned with respect to said locator markings; and v) folding said leaf means by way of said edge portion hinge means over said support surface and over said sampled filter specimen adhesively secured to said surface, whereby said specimen is protected from physical or chemical disturbance during handling of said card and specimen within said monitoring system, said leaf means being dimensioned such that the area of said surface which said leaf means overlies when said leaf means is folded over said support surface does not include said edge segment of said base means which contains said indicia means, whereby said indicia means is exposed to view when said leaf means is folded over onto said filter specimen.

9. The method of claim 8 wherein said base means and leaf means are each substantially rectangular and formed respectively with a top edge, a bottom edge and opposite first and second side edges, said second side edge of said leaf means being hingedly connected to said second side edge of said base means to allow said leaf means to be folded over said base means, said base means being provided with a cut-out in its said first side edge, said cover means formed with an inner end and an outer end provided with a gripping section, said cover means extending from said second side edge of said base means to said first side edge of said base means with said gripping section lying across said cut-out, said cover means being secured to said base means substantially from end to end by said adhesive means whereby said cover means can readily be removed by gripping said section thereof overlying said cut-out and peeling said cover means upwardly away from said support surface.

* * * * *